Nov. 5, 1957 L. H. CHASE 2,811,779
MEASURING DEVICE
Filed April 28, 1953 3 Sheets-Sheet 1
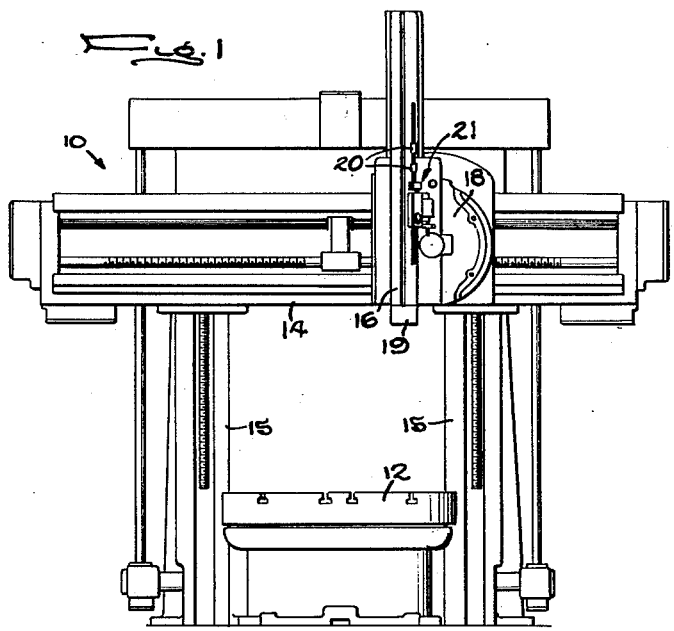
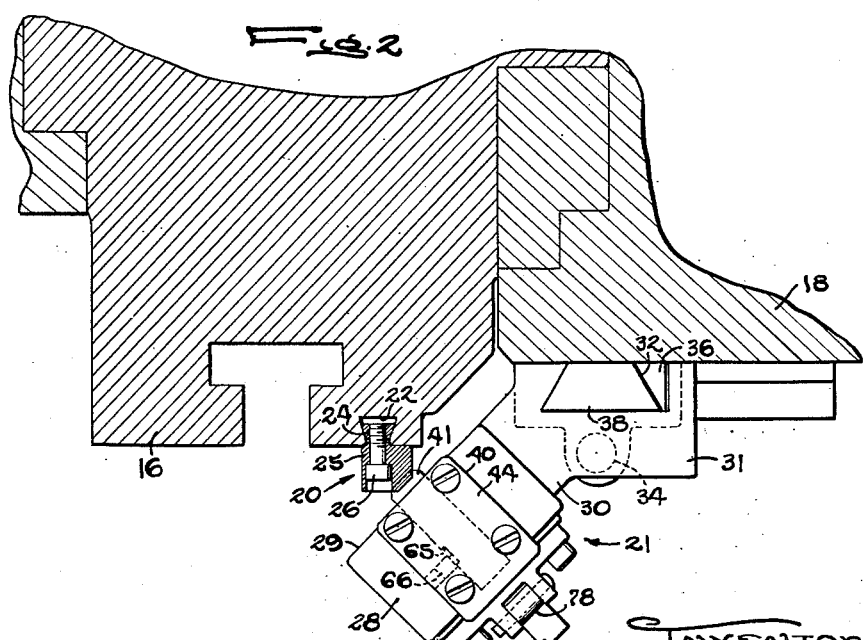
INVENTOR
Lloyd H. Chase
Carlson, Pitzner, Hubbard & Wolfe
ATTORNEYS

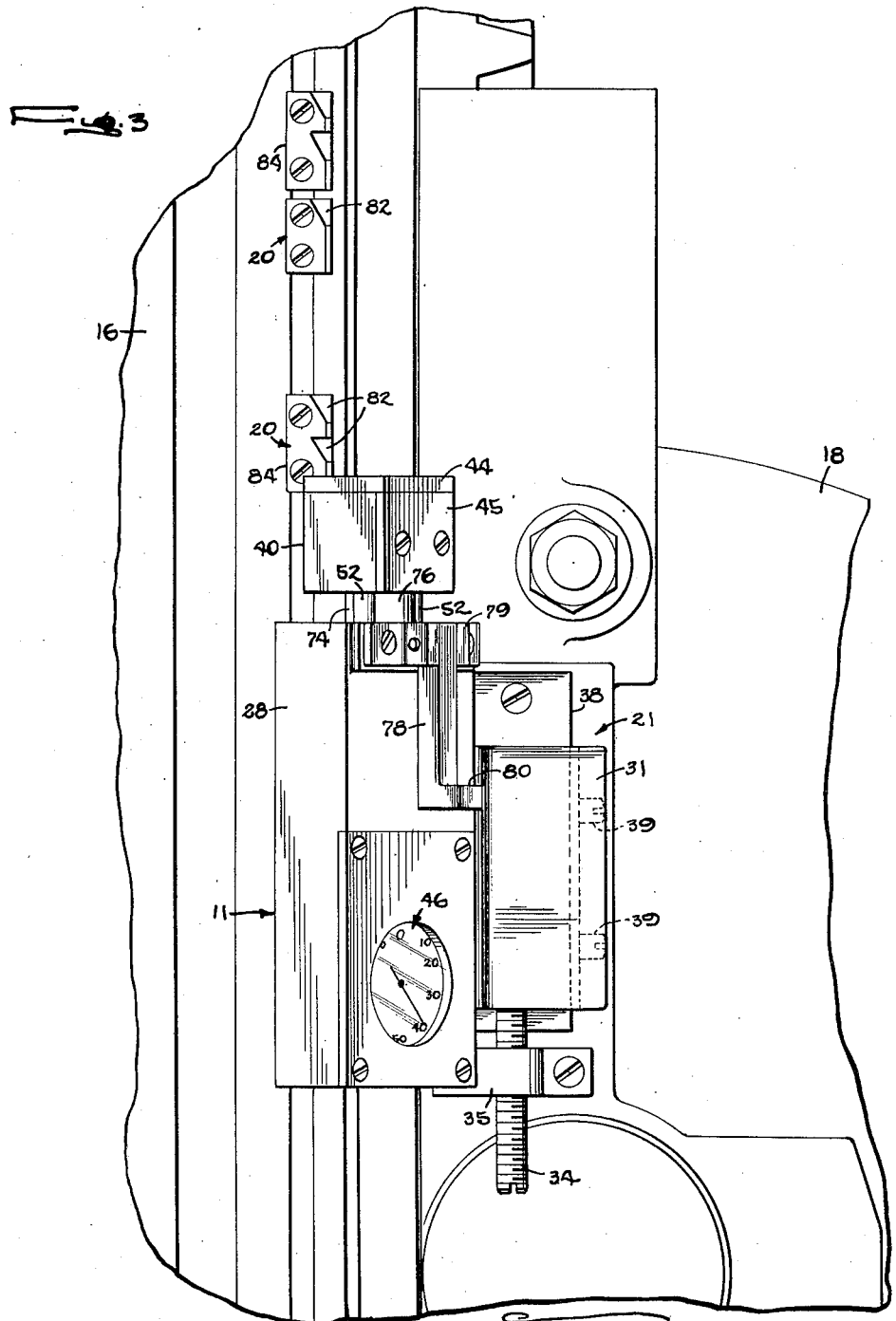

Nov. 5, 1957

L. H. CHASE 2,811,779

MEASURING DEVICE

Filed April 28, 1953

INVENTOR
Lloyd H. Chase
Carlson, Pitzner, Hubbard & Wolfe
ATTORNEY

United States Patent Office 2,811,779
Patented Nov. 5, 1957

2,811,779

MEASURING DEVICE

Lloyd H. Chase, Fond du Lac, Wis., assignor to Giddings & Lewis Machine Tool Company, Fond du Lac, Wis., a corporation of Wisconsin Application April 28, 1953, Serial No. 351,697

5 Claims. (Cl. 33—125)

The present invention relates generally to measuring devices and more specifically to a new and improved device for measuring the amount of movement between relatively movable members and positioning them relative to each other. In particular application, the present invention relates to a measuring device for use with machine tools requiring precision measurement of the distance of travel, and position, of parts of the machine tool.

It is a general aim of the present invention to provide a new and improved measuring device capable of accurate measurement of the relative movement and position of movable members. It is another object to provide a novel and improved device which will indicate with precision a predetermined position of a movable member and will automatically permit the member to pass the predetermined position without manual operation or manipulation of the device.

A further object of the invention is to provide a measuring device which will measure a series of predetermined distances of travel of a machine tool element without manual resetting or manipulation by the machine operator. It is a related object to provide a measuring device for a production job on a machine tool, involving a number of workpieces to be machined to the same dimensions, which will automatically indicate each of a series of machine tool positions with precision for each successive workpiece without manual resetting or readjustment of the device by the machine tool operator either between positions or between workpieces.

It is another object of the invention to provide a measuring device of simple, low cost construction capable of being rapidly and accurately set up on a machine tool. It is also an object to insure against damage and breakage of the measuring device even though the machine operator may be negligent or forgetful of stopping the machine at one of the predetermined positions.

Another object of the invention is to provide a measuring device for measuring the relative positions of a pair of movable members employing a dial indicator and a measuring head which is used for measuring purposes and the movement of which is transmitted to the indicator. A related object is to provide a construction wherein the measuring head carries an abutment pawl which is slidably mounted on the head so as to move into and out of interfering engagement with a movable member whose relative position is to be measured. Another object of the invention is to provide for the measuring head travel to be divided into a measuring operation and a pawl retracting operation and, so as not to disturb the accuracy of measurement, retractively actuating the abutment pawl only subsequently to the completion of the measuring operation.

Further objects and advantages of the invention will become apparent as the following description proceeds, taken in connection with the accompanying drawings, in which:

Figure 1 is a front elevation of an illustrative machine tool to which is attached a measuring device embodying the present invention.

Fig. 2 is a top plan view of the measuring device showing the supporting parts of the machine tool in cross section.

Fig. 3 is a partial front elevation on an enlarged scale of the machine in Fig. 1 showing the details of the measuring device.

Figure 4:
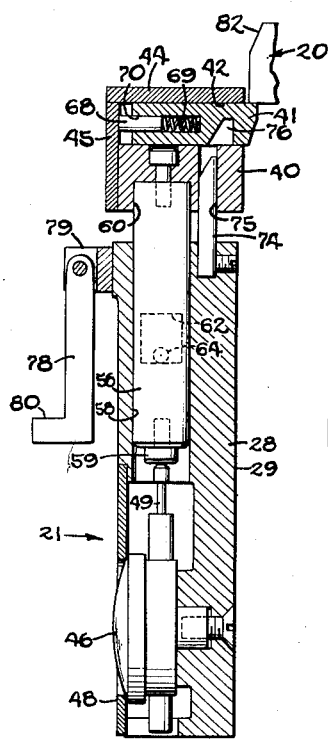
Fig. 4 is a vertical section of the measuring device taken along the median plane.
Figure 5:
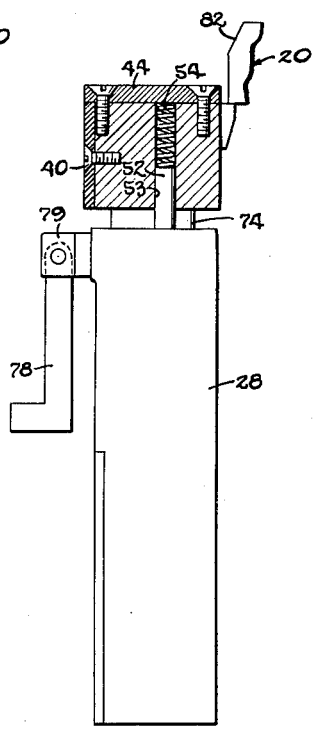
Fig. 5 is a side elevation of the measuring device with the head member in section to show the construction of the guide pins.

While the invention is susceptible of variation, modifications and alternative constructions, a preferred embodiment has been shown in the drawings and will be described below in considerable detail. It should be understood, however, that there is no intention to limit the invention to the specific form disclosed, but on the contrary the intention is to cover all modifications and alternative constructions falling within the spirit of the appended claims.

Referring now to the drawings, Fig. 1 shows a partial view of a machine tool 10 to which is attached a measuring device embodying the present invention. The illustrative machine is a vertical boring mill 10 of well known construction, having a work table 12 rotatable about a vertical axis, and a horizontal cross rail 14 supported above the table by vertical frame members 15. A tool ram 16 is mounted on the cross rail 14 for crosswise movement by means of a swivel head 18 which in turn provides angular adjustment and relative longitudinal movement of the ram. Carried by the lower end of the ram 16 is a tool holder 19 to hold cutting tools for machining workpieces on the rotatable work table.

Positioning of relatively movable members of a machine tool, such as the ram 16 in the illustrative machine, requires accuracy and precision for high quality work. In production jobs, it is also highly desirable that the positioning be done quickly with a minimum of effort by the machine operator after an initial set up is made. In the present instance, positioning of the ram and a tool carried by it is accomplished by the joint action of stops or abutments 20 on the movable ram 16, and an indicating device 21 having coacting abutments, mounted on the relatively stationary swivel head 18. In application of the present invention to other machines and machine parts, the coating stops and indicating device could be mounted on relatively movable members, such as a work table and bed, or a headstock and base, or other parts whose relative movement is to be measured.

As shown in the drawings, a series of stops or abutments 20 are provided on the ram 16 to permit positioning of the ram and its cutting tool at several positions relative to the work. Any desired number of stops may be used and a particular stop may be used to indicate the position for beginning or ending a cut, while a pair of adjacent stops may measure the length of a cut or other machining operation. In the illustrated construction, the stops 20 are slidably mounted in a dovetail groove 22 extending longitudinally on the front face of the ram to allow positioning of the stops at a predetermined position, as will be explained hereinafter. To permit clamping of the stops in a fixed position in the dovetail groove, they are formed of a two piece construction. A tail piece 24 of complemental dovetail shape and slidable in the dovetail groove 22 is fastened by a bolt 26 to an abutment piece 25 which overlies the edges of the groove and projects outwardly from the ram face. Tightening of the bolt 26 clamps the sides and edges of the groove 22 between tail piece 24 and abutment piece 25 to hold the stops 20 in a desired longitudinal position on the ram 16.

The coacting measuring or indicating device 21 in the preferred embodiment has a supporting casing or housing 28 of generally rectilinear construction, positioned to have its rear wall 29 closely spaced to the projecting ends of the stops 20. In the present instance, the housing is angled slightly in plan view with respect to the front face of the ram 16, and the adjacent corners of the stops 20 are cut off on a diagonal parallel to the rear wall of the housing.

This casing or housing 28 is supported on the swivel head 18 by an angle bracket 30 which in the present instance is adapted to provide limited vertical adjustment of the housing. The bracket 30 is formed integrally with the housing and is provided with a mounting flange 31 slidably fastened by means of a dovetail connection 32 to the swivel head 18. Beneath the bracket is an adjusting screw 34 supported by a threaded bracket 35 for precise vertical adjustment of the housing 28. If desired, a locking mechanism for the bracket and housing may be used. In the preferred embodiment, this comprises a triangularly shaped shoe 36 positioned between one leg of the angle bracket and a dovetail guide bar 38 on swivel head 18. A pair of set screws 39 are provided on one side of the angle bracket 30, and are adapted to bear against the shoe 36 for pressing the latter into locking engagement with the guide bar 38.

For engaging the stops 20 on the ram when the ram has moved downwardly to a desired position as determined by the location of a particular stop, a measuring head 40 having a rearwardly projecting abutment, in the form of a trip or pawl 41, is provided on the upper side of the measuring device housing 28. In the illustrative device, the head 40 is formed of rectilinear block shape with a forwardly and rearwardly extending slot 42 of rectangular cross section in its upper portion. The pawl 41 comprises a small bar of rectangular cross section of a size permitting relative sliding movement within the receiving slot 42. The open top and front end of the slot are covered to retain the pawl in the slot by means of a top plate 44 and front face plate 45 bolted to the head. In its normal operative position, a portion of the pawl 41 projects rearwardly from the head into the path of the stops 20 on the movable ram. The upper side surface of the pawl 41 and the lower side surface of the stops 20 are perpendicular to the direction of travel of the ram so that solid contact is obtained upon interfering engagement between the pawl and the stops.

Figure 6:
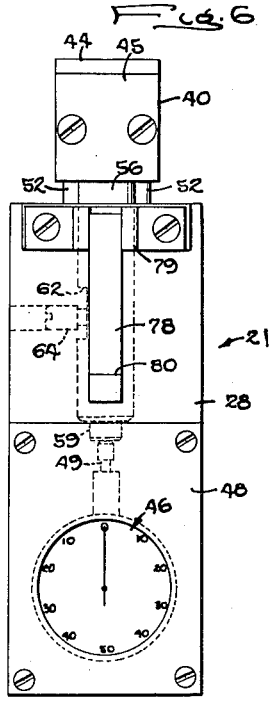
Fig. 6 is a front elevation of the measuring device.

To indicate more accurately the position of the movable ram than is possible by mere reliance upon feel or contact between the stops and pawl, a dial indicator 46 is provided to measure relative downward movement of the pawl 41 after contact is made with a stop 20. In practice, the stops 20 on the ram 16 are adjusted so that a stop engages the pawl 41 a short distance above or ahead of the final desired ram position, as shown in Figs. 3 and 4. During that last short distance of travel, the dial indicator 46 records the movement of the ram in thousandths or ten thousandths of an inch, until the dial shows a predetermined reading which indicates final position of the ram, as shown in Fig. 6.

In the present construction, a dial indicator 46 of well known construction for measuring small linear distances is shown mounted on the lower front face 48 of the measuring device housing. Projecting upwardly from the side of the dial indicator is an axially movable stem 49, the movements of which are amplified and transmitted to an indicator needle on a dial face. The stem 49 is resiliently biased toward its extended position by means of springs (not shown), located within the dial indicator housing.

To actuate the indicator stem 49 in unison with the ram 16 through a small distance before a final stop position is reached, means are provided to permit limited vertical movement of the measuring head 40 and pawl 41 relative to the housing 28 and swivel head 18, and to transmit that relative movement to the indicator stem 49. This is accomplished by constructing the measuring head 40 as a separate unit from the measuring device housing 28 and providing a pair of spaced, parallel guide pins or rods 52 on the top of the housing to guide the head for up and down movement. The guide pins 52 project upwardly from the housing and are slidably received in a pair of spaced, guide holes 53 opening at one end to the bottom wall of the measuring head and being closed at the other end by the cover plate 44. To maintain the head in its uppermost position for initial contact between the pawl and stops, resilient means are provided. For this purpose, coil springs 54 are placed between the ends of the pins 52 and the closed ends of the guide holes to urge the head resiliently upward away from the housing 28.

A plunger 56 supported for axial movement in a central bore 58 in the measuring device housing transmits the downward movement of the measuring head 40 to the indicator stem 49. The lower end of the plunger has a button 59 for bearing engagement with the end of the indicator stem 49 and the upper end is received in a shallow bore 60 in the bottom of the measuring head 40. A bolt 61 extending through a counterbored hole from the pawl slot 42 to the plunger receiving bore 60 holds the plunger for movement in unison with the head. Thus the dial indicator stem 49 is moved in unison with the ram 16 as the head 40 is pressed downwardly against the resilient force of the spring 54 by the coaction of the pawl 41 and a stop 20 on the ram.

To limit both upward movement of the head 40 due to the resilient force of the coil springs 54 and the downward movement due to engagement of the pawl 41 by a stop 20, a double ended longitudinal slot 62 is provided in one side of the plunger 56. A stop screw 64, received in a threaded hole in the side of the housing 28, projects into the longitudinal slot 62. Interfering engagement between the projecting end of the stop screw 64 and closed ends of the slot 62 limit axial movement of the plunger 56 and measuring head 40.

Thus far described, the measuring device is operative only with a single stop on the movable ram. The operator of the machine could, of course, loosen or remove the stops as they engage the pawl, or a hinge could be provided for the operator to swing the measuring device housing away from the ram after each stop engages the pawl. This, however, is unhandy and time consuming. It also has the danger that the operator may forget to manipulate the device causing the stops or the measuring device to be damaged.

In practicing the invention, means are provided for allowing the measuring device to be disengaged from each stop automatically for measuring the next ram position. For this purpose, the previously described relative downward movement of the measuring head 40 is utilized to move the pawl 41 out of the path of an engaged stop 20 after a predetermined amount of movement and subsequently to move the pawl 41 back into the path of the next succeeding stop 20.

To accomplish this automatic operation, the pawl 41 and the pawl receiving slot 42 in the measuring head 40 are constructed to permit longitudinal sliding of the pawl 41 from its normal operative position to a retracted position. In the normal operative position, with the stop engaging end portion of the pawl projecting rearwardly from the end of the receiving slot into the path of the stops 20, the inner end of the pawl is spaced from the closed end of the slot to provide room for axial movement of the pawl into the receiving slot. The pawl is limited to movement between the operative and retracted positions by a double ended slot 65 and a stop screw 66 extending through the side wall of the head into the slot. A biasing plunger 68 and spring 69, Fig. 4, located in a blind, axial bore 70 in the inner end portion of the pawl 41 and arranged to bear against the slot closing face plate 45, constitute means for resiliently urging the pawl into its normal position.

For moving the pawl 41 into its retracted position to clear an engaged stop 20, cam means operative upon downward movement of the measuring head 40 are provided. In the preferred embodiment, the cam means comprises a sloping cam surface 71 on the pawl shank and a mating cam surface 72 on the upper end portion of the housing 28. As shown in the drawings, the latter cam surface 72 is formed on the upper end portion of an upright trip rod 74 mounted on the top of the housing. The projecting portion of the trip rod 74 is received in an alined, vertical passage 75 which is formed in the lower portion of the measuring head 40 and extends at its top end into the bottom wall of the pawl receiving slot 42. Since the measuring device housing 28 and its projecting trip rod 74 are stationary, relative downward movement of the measuring head will cause the upper end of the trip rod to extend farther and farther into the vertical passage and finally into the pawl receiving slot.

Figure 7:
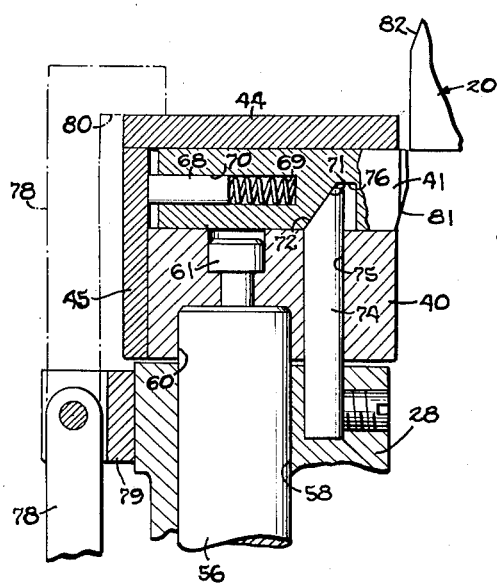
Fig. 7 is a partial vertical section of the measuring device corresponding to Fig. 4 but on an enlarged scale and showing the device in retracted position.

The cam surfaces 71, 72 on the pawl and trip rod are arranged such that when the projecting end of the rod 74 extends into the pawl receiving slot, the cam surfaces engage and force the pawl 41 to its retracted position, see Fig. 7. For this purpose, the mating cam surfaces are sloped diagonally upwardly toward the projecting end of the pawl. The cam surface 71 on the pawl is a sloping side face of a generally triangularly shaped notch 76 formed on the underside of the pawl 41, while the cam surface 72 on the trip rod 74 is a bevel or sloping chisel face on its end portion. To permit initial engagement of the cam surfaces, the cam notch 76 on the pawl is positioned lengthwise of the pawl so that in the extended pawl position a small portion of the notch opens to the trip rod passage 75, as seen in Fig. 4. In the retracted or cammed position of the pawl, the notch 76 is moved inwardly by the trip rod 74 to a full open position over the passage 75.

After contact is made between the pawl 41 and a stop 20 on the ram of the machine tool, continued downward movement of the ram and stop presses the pawl 41 and measuring head 40 downwardly toward the housing 28, as previously described. This relative movement of the head causes the dial indicator 46 to measure the additional movement of the ram and also moves the cam surface 71 of the pawl downwardly toward the trip rod 74. When a predetermined stop position is indicated on the dial indicator, the operator will stop the ram 16 and make whatever machine adjustments are called for by the next machining operation. Final downward movement of the head upon continued movement of the ram 16 causes the cam surfaces 71, 72 of the pawl and trip rod to engage, and to cam the pawl away from the contacted stop. The ram 16 is now free to continue downwardly in its working cycle and the measuring head 40, by virtue of its biasing springs 54, returns to its upper position. At the same time, the pawl 41 is freed of the cam action of the trip rod 74 and is resiliently urged outwardly to its normal operative position, automatically reset ready for the next measuring operation.

To permit the described sequential operation, the travel of the measuring head is limited, as by the slot and stop screw arrangement 62, 64, to actuation of the indicator stem 49 through only a portion of its total range of movement. Preferably, an intermediate portion of the indicator stem movement is used by relating the length of plunger 56 to the indicator stem location. This prevents indicator damage from over travel and minimizes end play and looseness. The measuring head travel, thus limited, is divided into a measuring portion and a pawl retracting portion as determined by the upward position of the trip rod cam surface 72. The slopes of the cam surfaces 71, 72 are angled relative to the retracting portion of travel to cause transverse movement of the pawl 41 sufficient to clear the abutment stops 20 on the ram. The relative position and slope of the cam surfaces will, of course, depend in each case on the actual size of the dial indicator and measuring device.

If it should be desired to hold the measuring device out of operation, latch means are provided to hold the pawl 41 in retracted position. In the illustrated form, the latch comprises a bar 78 supported at one end for vertical swing by a pivot pin bracket assembly 79 bolted to the front face of the measuring device housing. The bar 78 has a short latching abutment 80 at its free end, positioned to extend rearwardly over the top of the measuring head 40 when the latch bar is swung to an upright position and the measuring head is pressed downwardly toward the housing, see Fig. 7. The latch thus holds the measuring head in a lowered position in which the pawl is cammed inwardly away from the stops on the ram.

As a further feature of the measuring device embodying the present invention, the head 40 and pawl 41 are adapted to permit the direction of movement of the ram 16 and its position stops 20 to be reversed for returning the ram to its initial position, as in the non-working portion of a machining cycle, without manipulation of the measuring device. In this instance, the projecting end faces of the pawl 41 and of the stops 20 are provided with mating cam surfaces for retracting the pawl upon reverse movement of the stops past the measuring device. Formed on the end face of the pawl 41 is a diagonal cam surface 81 extending from about the midpoint of the end face downwardly and away from the end, cutting the bottom end corner of the pawl. Each stop 20 is provided with a mating cam surface 82 extending from about the midpoint of its end face diagonally upwardly and away from its end face, cutting the upper end corner of the stop. As the ram and the stops are moved upwardly the cam surfaces 81, 82 on the stops and the end face of the pawl cause the pawl to be cammed away from the stops into retracted position permitting the stop to pass by the retracted pawl. The pawl spring 69 resiliently urges the pawl outwardly of the measuring head 40 to its operative position as soon as each stop has passed, and the pawl is again ready to engage the stops 20 on the downward working portion of the next cycle of operation.

A typical setting up operation for a production run will illustrate the operation of the present device. Assuming that the ram 16 is equipped with a suitable cutting tool and a work piece is mounted on the work table 12, the ram is lowered to position for the first machining cut. The desired position of the ram may be determined by taking a trial cut, by gage blocks or other suitable means. When this position is determined, a stop 20 is placed in the dovetail slot in the ram and is moved downwardly against the pawl 41 of the measuring device until the dial indicator 46 shows a zero reading. Alternatively, the housing 28 may be moved upwardly against the stop by means of the adjusting screw 34 to obtain a zero or other arbitrary reading for the first position. The ram may now be moved to its next cutting position. The pawl automatically retracts to allow the first stop to pass the indicating device and move through the first predetermined ram position. A second stop is then placed in the dovetail slot. This stop is likewise positioned to give a zero reading of the indicator. The adjustment screw 34 is not used for obtaining a zero indicator reading for the second or succeeding stops, since to do so would change the adjustment for the first stop.

As many stops as needed may be used. In some instances, it is contemplated that the stops for a given production job may be made as an integral unit, that is, a single stop rod with projecting stop portions at predetermined positions along the rod. Such an integral device greatly simplifies the setting up procedure. A stop rod 84 having two stops is shown in the drawing, and is shaped particularly for a pair of stops which must be close together. The previously mentioned one-piece job rod would be similar having the number of stops and spacing between stops needed to suit the desired machining cycle.

After the set up is completed, the operator on each succeeding production piece need only run the ram downwardly until the indicator shows a zero or other previously selected arbitrary reading and the cut may be started. The ram automatically trips the measuring device as the cutting proceeds while the pawl is thereafter automatically reset ready for indicating the next stop position. At the end of the complete machining operation or at any intermediate point, the ram may be lifted, and the measuring device will automatically trip and reset as the stops 20 pass the pawl 41 on the return stroke. When the stops have all passed the measuring device, the machine then is ready for the next work piece.

I claim as my invention:

1. A device for measuring the relative movement of a pair of members arranged for relative movement in forward and reverse directions, comprising in combination, a housing adapted to be mounted on one of said members and having a head portion mounted thereon for sliding movement from an initial position relative to said housing in a direction parallel to the movement of said members, indicator means fixedly mounted in said housing for measuring the amount of movement transmitted thereto, means for actuating said indicator means in unison with movement of said head portion in the forward parallel direction, a pawl slidably mounted on said head portion transverse to movement of said head portion and said members from an extended position to a retracted position, a series of stop abutments adapted to be adjustably mounted on the other of said members in predetermined, alined positions in a direction parallel to the relative movement of said members, said stop abutments being positioned for engagement with said pawl in its extended position by individual ones of said stop abutments upon relative movement of said members so that continued relative movement of said members in the forward direction causes said pawl and head portion to be moved in the forward parallel direction a substantial pre-set distance to actuate said indicator means, mating cam surfaces on said pawl and said housing arranged upon camming engagement to move said pawl to its retracted position upon movement of said pawl and head portion a further distance in the forward parallel direction to permit an engaged stop abutment to pass said pawl, said mating cam surfaces being spaced from each other to be out of camming engagement during forward movement of said pawl and head portion said pre-set distance and brought into camming engagement to move said pawl retractively only subsequently to the completion of the measuring operation so as not to disturb the accuracy of measurement, mating cam surfaces on said pawl and said stop abutments to move said pawl to its retracted position upon engagement therebetween in the reverse movement of said members, and resilient means for restoring said head portion to its initial position and said pawl to its extended position to reset said device after actuation by individual ones of said stop abutments.

2. A measuring device for measuring the movement of a pair of relatively movable members arranged for relative movement substantially parallel to each other in forward and reverse directions, comprising in combination, a series of abutments adapted to be mounted on one of said members in predetermined alined positions parallel to the direction of relative movement, indicator means having a movable element and adapted to measure small increments of movement of said movable element, a housing adapted to be mounted on the second of said members for supporting said indicator means, a head portion slidably mounted on said housing for movement relative thereto in a direction parallel to the direction of relative movement of said members, a pawl slidably supported on said head for movement transverse to said relative parallel movement between an extended position and a retracted position, said pawl being positioned in its extended position to project into the path of interfering engagement with said abutments upon relative movement of said members so as to move said head portion from its initial position relative to said housing upon interfering engagement between said pawl and individual ones of said abutments, means for transmitting relative movement of a substantial pre-set distance of said head portion to said movable element of said indicator means for measuring relative movement of said members following initial interfering engagement in a measuring operation, cam means for moving said pawl to its retracted position out of the path of interfering engagement upon predetermined movement of said head portion to permit said engaged abutment to pass said pawl, said cam means being out of camming engagement during forward movement of said head portion said pre-set distance and brought into camming engagement to move said pawl retractively only subsequently to the completion of the measuring operation so as not to disturb the accuracy of measurement, and resilient means for restoring said head portion to its initial position and said pawl to its extended position.

3. A measuring device for measuring the relative positions of a pair of movable members arranged for relative movement in forward and reverse directions comprising, in combination, a housing adapted to be mounted on one of said members, a dial indicator means for measuring movement transmitted thereto, said indicator means being mounted on said housing, a plunger slidably supported in said housing for movement parallel to the movement of said members and having one end portion adapted for actuating said indicator means, a head portion on said housing, guide means for slidably mounting said head portion on said housing for movement parallel to the movement of said members from an initial position spaced from said housing, said head portion being adapted to engage the other end of said plunger so that movement of said head portion from the initial position through a substantial predetermined distance is measured in a measuring operation by said indicator means, resilient means for urging said head portion toward its initial position, an abutment pawl slidably mounted on said head portion for movement transverse to the parallel movement of said members, said pawl in one limit position of sliding movement being retracted into said head portion and in the other limit position being extended for interfering engagement with the other of said movable members so that said pawl and head portion are moved toward said housing to actuate said indicator means upon interfering engagement of said pawl by relative movement of said members in the forward direction, said housing and said pawl having cam surfaces for moving said pawl to its retracted position upon movement of said head portion beyond said predetermined distance, said cam surfaces being out of camming engagement during movement of said head portion said predetermined distance and coacting in camming engagement to move said pawl retractively only subsequently to the completion of the measuring operation so as not to disturb the accuracy of measurement, and resilient means urging said pawl toward its extended position to reset the measuring device after interfering engagement thereof with said other movable member.

4. A device for measuring the position of a pair of members relatively movable in reverse directions comprising in combination, a housing adapted to be mounted on one of said members, a transversely projecting abutment mounted on the other of said members, an indicator for measuring linear distances mounted in said housing, a plunger supported in said housing for axially slidable movement parallel to the relative movement of said members, said plunger having one end portion projecting outwardly from said housing and its other end portion positioned for actuating said indicator, a head portion fixed to the projecting end portion of said plunger for unison movement therewith toward and from said housing, means for resiliently biasing said head portion and plunger outwardly from said housing, a pawl mounted in said head portion for transverse movement to and from said abutment between an outer limit position in a path of interfering engagement with said abutment for moving said head portion toward said housing a substantial pre-set distance upon interfering engagement of said pawl and abutment in one of said directions of relative movement of said pair of members to actuate said indicator in a measuring operation and an inner-limit position out of said path of interfering engagement, means for resiliently biasing said pawl to its outer limit position, a first cam means including an inclined cam portion on said pawl and a cam rod on said housing having a mating inclined cam portion slidably received in said head portion for moving said pawl out of interfering engagement with said abutment upon movement of said head portion toward said housing beyond said pre-set distance, said cam portions being spaced from camming engagement during movement of said head portion said pre-set distance and brought into camming engagement to move said pawl retractively only subsequently to the measuring operation so as not to disturb the accuracy of measurement, and second cam means including mating cam surfaces on said abutment and pawl for moving said pawl transversely out of engagement with said abutment upon relative movement of said pair of members in the opposite one of said directions.

5. A device for measuring the positions of a pair of members relatively movable in forward and reverse directions comprising in combination a housing adapted to be mounted on one of said members for movement therewith, an abutment mounted on the other of said members for movement therewith, a head portion movably supported on said housing and guided for movement parallel to the relative movement of said pair of members between forward and reverse limit positions, said head portion performing a measuring operation during a substantial initial period of such movement, a pawl movably supported and guided on said head portion for movement relative thereto in a direction transverse to the relative movement of said pair of members between limit positions in and out of a path of interfering engagement with said abutment, means for biasing said head portion toward its reverse limit position, means for independently biasing said pawl toward its limit position in said path of interfering engagement, mating cam surfaces on said housing and said pawl for moving said pawl out of the path of interfering engagement upon movement of said head portion toward its forward limit position, said cam surfaces being out of camming engagement during said initial forward movement of said head portion and brought into camming engagement to move said pawl transversely only subsequently to the measuring operation so as not to disturb the accuracy of measurement, mating cam surfaces on said abutment and pawl for moving said pawl out of the path of interfering engagement upon relative movement of said pair of relatively movable members in reverse direction, a measuring indicator for linear distances, and means for transmitting the movement of said head toward its forward limit position to said indicator for actuating the latter.

References Cited in the file of this patent

UNITED STATES PATENTS 2,462,226     Rosenow                Feb. 22, 1949